US009342520B2

(12) United States Patent
Roscoe

(10) Patent No.: US 9,342,520 B2
(45) Date of Patent: May 17, 2016

(54) SYSTEM AND METHOD FOR CHANGEABLE DYNAMIC DIRECTORY

(75) Inventor: Gary William Roscoe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1190 days.

(21) Appl. No.: 11/567,503

(22) Filed: Dec. 6, 2006

(65) Prior Publication Data

US 2008/0141178 A1    Jun. 12, 2008

(51) Int. Cl.
*G06F 3/048*    (2013.01)
*G06F 17/30*    (2006.01)

(52) U.S. Cl.
CPC ................................ *G06F 17/30067* (2013.01)

(58) Field of Classification Search
CPC ............ G06F 3/0482; G06F 17/30873; G06F 3/0481; G06F 17/30994
USPC .......................................................... 715/854
See application file for complete search history.

(56) References Cited

U.S. PATENT DOCUMENTS

2003/0105771 A1 *    6/2003    Tiefenbrun ....... G06F 17/30126

OTHER PUBLICATIONS

Paul McFedries, "Microsoft Windows Vista Unveiled," Jun. 9, 2006, Microsoft Press.*
Charlie Russel et al., "Special Edition Using Microsoft Office Outlook 2003," Sep. 2003, Chapter 4.*
"Outlook 2003 Screenshots".*
Ed Bott et al., "Microsoft Windows XP Inside Out Deluxe, Second Edition," Oct. 2004.*
Joe Kraynak, "Complete Idiot's Guide to PC's, The, Eighth Edition," Sep. 2001.*
John Ray et al., "Sams Teach Yourself Mac OS X in 24 Hours, Second Edition," Nov. 2002, pp. 2, 24, 25, and 33.*
Dave Taylor, "Learning Unix for Mac OS X Tiger," Jun. 2005, Chapter 3, Figure 3-4.*

* cited by examiner

*Primary Examiner* — William Trapanese
(74) *Attorney, Agent, or Firm* — MH2 Technology Law Group LLP

(57) ABSTRACT

An embodiment generally relates to a method for displaying data. The method for displaying data includes a changeable directory module (CDM). The CDM is configured to determine a plurality of attributes for a data set. In determining a plurality of symbols, the CDM associates each symbol with a respective attribute. The CDM is configured to display an initial sequence of symbols on a navigation pane. The CDM is also configured to re-sequence the initial sequence of symbols and display the data set according to the re-sequence of symbols on a display pane.

9 Claims, 5 Drawing Sheets

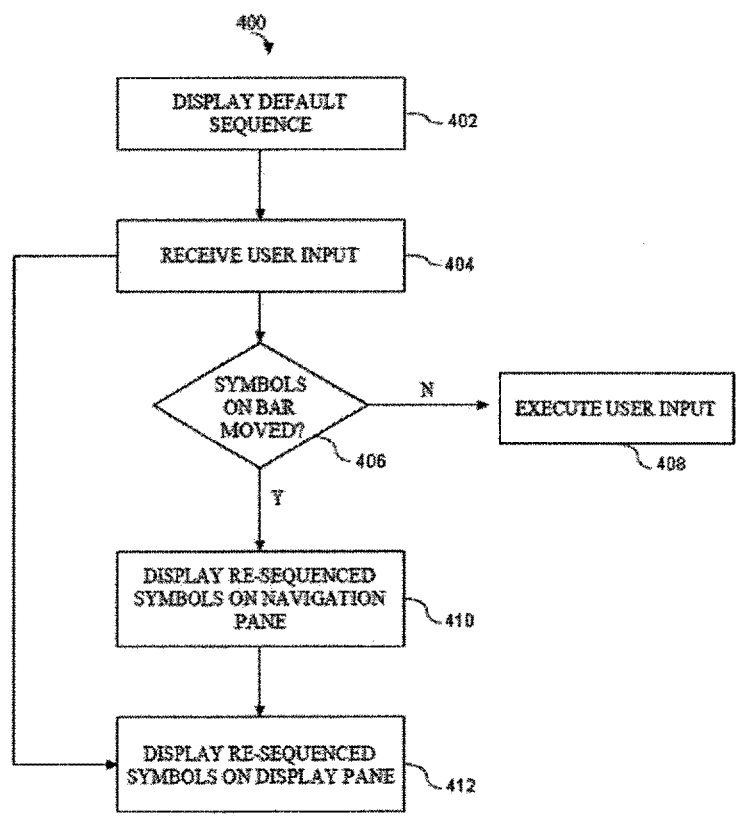

SYSTEM AND METHOD FOR CHANGEABLE DYNAMIC DIRECTORY

FIELD

This invention relates generally to information displays, more particularly, to a system and method for a changeable dynamic directory.

DESCRIPTION OF THE RELATED ART

In many applications, data may be organized in a systematic hierarchal structure. For example, MS-DOS or Windows file structure typically provide a tree-branch methodology of organizing data. More specifically, a user may create a main directory for the storage of data. The user may then create sub-directories under the main directory to store similar information. As an example, a user organizing digital images may store the digital images in a "My Pictures" directory. The user may then organize the data by using subdirectories such as "\July 2006 Pictures," "\Baby Pictures", etc.

Directory structures can be an intuitive way of organizing and navigating through data. However, there are drawbacks and disadvantages to directory structures. For example, the organization of the directory structure is static. As a result, a user of the data may be restricted to the organization of the directory as dictated by the original design of the directories.

Thus, it has been generally recognized that static, hierarchical systems of organizing data are inadequate to efficiently meet the needs of computer users attempting to access in an increasingly efficient manner. Conventional file systems are simply too unwieldy to deal with this information load in a way that is convenient to the user. They have become increasingly impractical for efficient data management.

SUMMARY

An embodiment generally relates to a method for displaying data. The method for displaying data includes a changeable directory module (CDM). The CDM is configured to determine a plurality of attributes for a data set. In determining a plurality of symbols, the CDM associates each symbol with a respective attribute. The CDM is configured to display an initial sequence of symbols on a navigation pane. The CDM is also configured to re-sequence the initial sequence of symbols and display the data set according to the re-sequence of symbols on a display pane.

Another embodiment relates to a device for displaying data. The device includes a CDM adapted to interface with data stored in non-volatile memory (NVM). The device also includes a display device configured to be driven by the CDM, wherein the CDM is configured to display a navigation pane coupled with a display pane. The CDM is also configured to define a plurality of attributes and associate a symbol with a respective attribute of the data set. The CDM is further configured to display an initial sequence of symbols on a navigation bar and a hierarchy of data in accordance to the initial sequence of symbols.

Yet another embodiment relates generally to a system for displaying data. The system includes an imaging machine and a diagnostic tool. The imaging machine is configured to store a directory of data in non-volatile memory (NVM). The diagnostic tool includes a CDM and a display device. The CDM is configured to interface with the NVM. The display device is configured to be driven by the CDM, wherein the CDM is configured to display a navigation pane coupled with a display pane. The CDM is also configured to define a plurality of attributes for the data in NVM and associate a symbol with a respective attribute of the data set. The CDM is further configured to display an initial sequence of symbols on a navigation bar and a hierarchy of data in accordance to the initial sequence of symbols.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3 illustrates an exemplary flow diagram implemented by the diagnostic tool in accordance with yet another embodiment;

FIG. 4 illustrates another exemplary flow diagram implemented by the diagnostic tool in accordance with yet another embodiment.

DETAILED DESCRIPTION OF EMBODIMENTS

Figure 1:
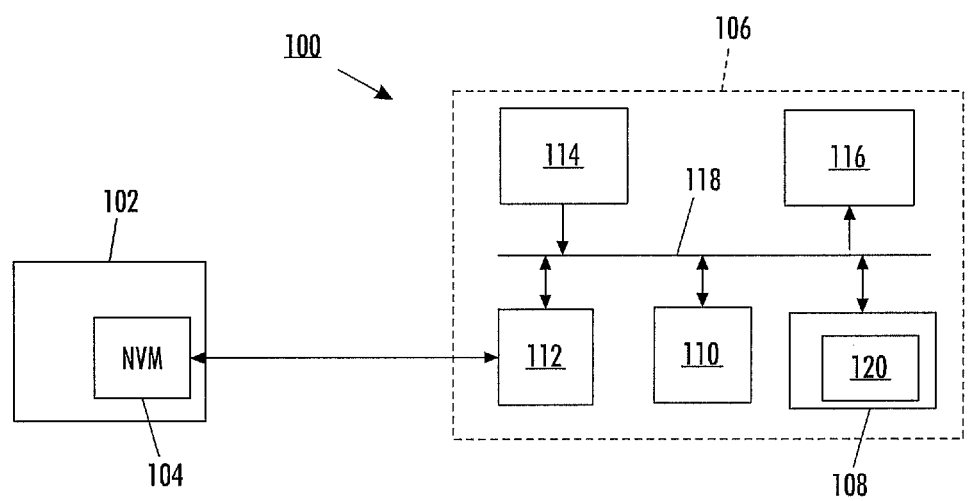
FIG. 1 illustrates an exemplary embodiment of a system configured to display data in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of file systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a system and method for displaying data stored in a non-volatile memory (NVM) based on a flexible and dynamic directory structure. More specifically, a changeable directory module (CDM) may be configured to display data from the NVM in a format specified by a user. The CDM may be configured to display a user interface comprising of a navigation pane and a displayed data pane. The CDM may also be configured to access data that is stored in non-volatile memory (NVM), where the data is defined by a set of attributes. A graphical symbol, i.e., icon, may be associated with each attribute (i.e., attribute symbol).

The CDM may initially display a sequence bar within the navigation pane. The sequence bar may have "ADD" symbol initially. The user may activate the ADD symbol to add attribute symbols. The attribute symbol represents a parameter, attribute, characteristic of the data stored on the NVM. The order of the attribute symbols dictate how the data is displayed in the displayed data pane. More specifically, as an example, a user may add the following symbols to the sequence bar: A1, B2, C3, and D5. The data may then be organized in a hierarchal fashion where the elements of the data having attribute A1 become the main data level. The elements of the NVM data having attribute symbols A1 and B2 become a leaf node. The elements of the NVM data having the common attribute symbols A1, B2, and C3 are grouped in leaf node from the previous leaf node (A1, B2) and so forth.

As the attribute symbols are being added to the sequence bar, the navigation bar displays a hierarchy corresponding to the order of the attribute symbols on the sequence bar. Continuing with the previous example, the hierarchy may include the elements of the data that fall under A1 as a root level in the hierarchy. A leaf branch from the root level displays the elements that fall within the attribute symbols A1 and B2. Another leaf branch from the previous leaf branch displays the elements of the data that are within the attribute symbols A1, B2, and C3 and so forth. With the displayed hierarchy, a user may traverse the hierarchy to quickly search for the desired information. By activating the appropriate leaf elements in the hierarchy, the user may then display the desired data on the displayed data pane.

In various embodiments, a user may re-order the sequence of symbols on the sequence bar, add attribute symbols or delete attribute symbols. The navigation pane may then display the re-sequenced symbols on the sequence bar and the corresponding hierarchy. Accordingly, when a user selects a displayed attribute symbol within the hierarchy in the navigation pane, the CDM may be configured to display the data defined by the selected attribute symbol and any intervening attribute symbols to the main branch.

FIG. 1 illustrates an exemplary embodiment of a system 100 in accordance with an embodiment. It should be readily apparent to those of ordinary skill in the art that the system 100 depicted in FIG. 1 represents a generalized schematic illustration and that other components may be added or existing components may be removed or modified. Moreover, the components of the system 100 may be implemented in hardware, software, or combinations thereof as known to those skilled in the art.

As shown in FIG. 1, the system 100 includes an imaging device 102 and a diagnostic tool 106. The imaging device 102 may be a copier, scanner, printer, multi-functional device or any other similar device. The imaging device 102 may include a non-volatile memory (NVM) 104. The NVM 104 may contain data for the imaging device 102 such as configuration data, programs, or applets, fault data, etc. For example, the data stored on the NVM 104 may be operating parameters for the individual modules of the imaging device 102. The operating parameters may then be used to initialize, to repair, and/or to calibrate the imaging device 102. The NVM 104 may be implemented with a flash memory, read-only memory, an EEPROM, or similar type of persistent memory.

The diagnostic tool 106 may be configured to assist in the configuration and/or setup of the imaging device 102. The diagnostic tool 106 may be implemented as a laptop computer, a handheld computer, a personal digital assistant, a testing platform or other similar portable computing product.

The diagnostic tool 106 may include a processor 108, a memory 110, a interface 112, a user interface 114, a display 116, and a shared bus 118. The processor 108 may be configured to provide the computing engine to provide the functionality of the diagnostic tool 106. The processor 108 may be a microprocessor, a digital signal processor, or an application specific integrated circuit (ASIC), or combination thereof.

The processor 108 may interface with the imaging device 102 via the interface 112 over the shared bus 118. The interface 112 may conform to a standard protocol such as universal serial bus, SPI, IEEE1394, X10, etc. Alternatively, the interface 112 may be a manufacturer specific serial protocol or a parallel protocol.

The processor 108 may also interface with the memory 110. The memory 110 may be configured to provide storage of application programs and data for the diagnostic tool 106. The memory 110 may be implemented with a flash memory, a programmable memory or other similar persistent memories. The memory 110 may also be combined with non-persistent forms of memories (e.g., DRAM, SRAM, etc.) to provide execution space for an operating system and application programs.

The user interface 114 and the display 116 may be configured to provide a mechanism for users to interface with the diagnostic tool 106. The user interface 114 may accept input from the user through a keyboard, mouse, or other similar input device. The display 116 may be configured to provide at least a user interface to display the results of the input into the user interface 114. The display 116 may be implemented as a liquid crystal display (LCD). Alternatively, the user interface 114 and display 116 may be combined into a single component, where a stylus may be used as user input device on the screen of the display 116.

Figure 2A:
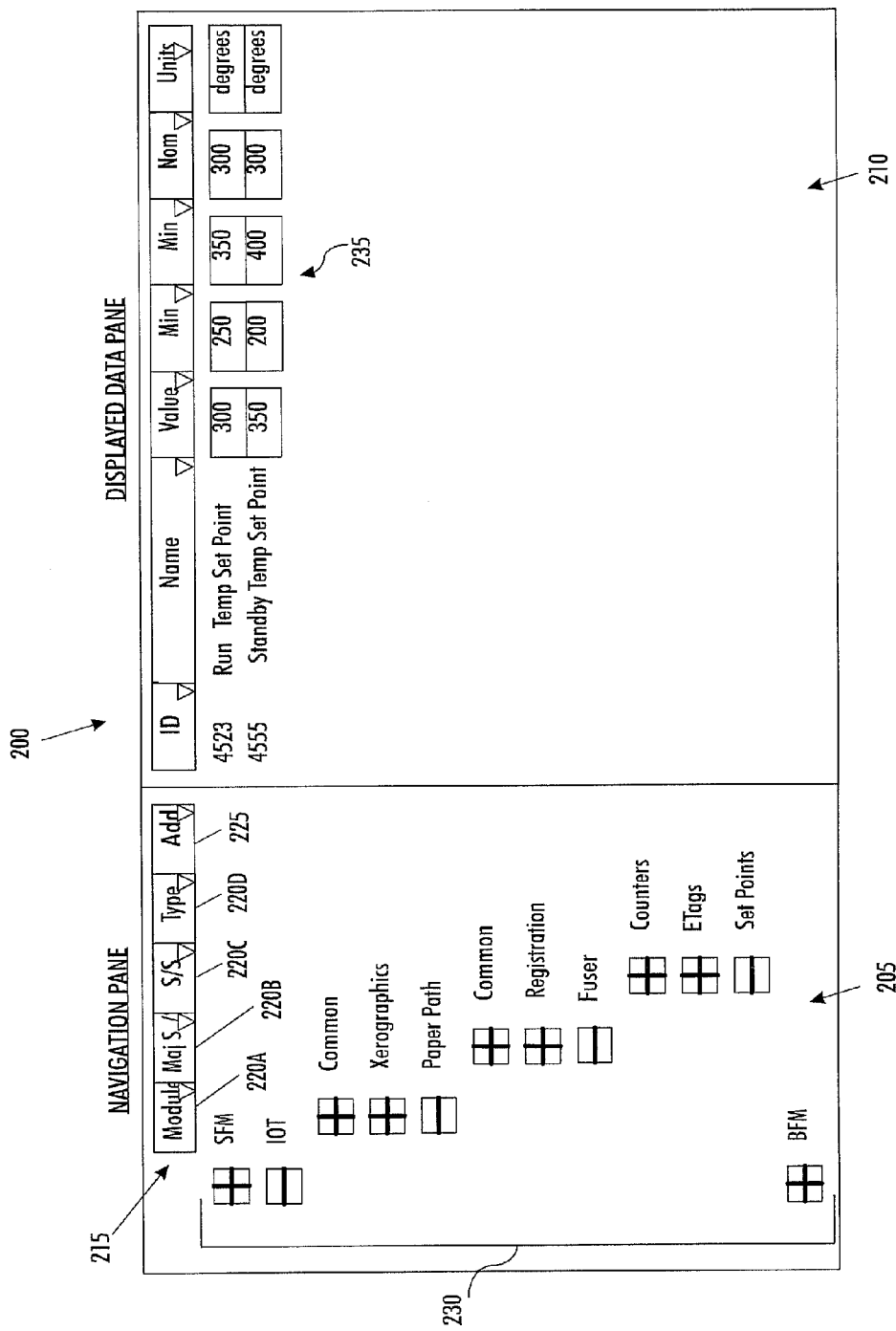
FIG. 2A illustrates an exemplary embodiment of the display device in accordance with yet another embodiment.

In some embodiments, the diagnostic tool 106 may also store and execute a computer program embodiment of a changeable directory module (CDM) 120. The CDM 120 may generate a user interface on the display 116 of the diagnostic tool 106, as shown in FIG. 2A. FIG. 2A illustrates an exemplary user interface 200 in accordance with an embodiment of the invention. It should be readily apparent to those of ordinary skill in the art that the user interface 200 depicted in FIG. 2A represents a generalized schematic illustration and that other visual elements may be added or existing visual elements may be removed or modified.

As shown in FIG. 2A, the user interface 200 may include a navigation pane 205 and displayed data pane 210. The navigation pane 205 may present a mechanism to create and navigate the data stored on the NVM 104 through user-created data hierarchies while the displayed data panes 210 may present the results of the navigation of the user.

The navigation pane 205 may also include a sequence bar 215. The sequence bar 215 may be considered a placeholder to hold attribute symbols created or placed by the user. Each piece of data may have multiple attributes, each attribute having an associated symbol. For example, a temperature set point for a fuser may have attributes of major, subsystem, IOT, etc. Accordingly, when a sequence of attribute symbols are displayed, the order of the attribute symbols may dictate the organization of the symbol.

Thus, as shown in FIG. 2A, the sequence bar 215 holds the attribute symbols for: module 220A, major subsystem 220B, subsystem 220C, and type 220D. The data on the NVM 104 is then organized by module 220A with sub-branches major subsystem 220B, subsystem 220C, and type 220D, each sub-branch being a leaf node from the previous leaf node. This hierarchal organization of the data of the NVM 104 is graphically displayed as data hierarchy 230.

Within the data hierarchy 230 of FIG. 2A, the module attribute 220A comprises of three elements of SFM, IOT and BFM. The major subsystem attribute 220B has three elements of common, xerographics, and paper path. The subsystem attribute 220C has three elements of common, registration, and fuser. The type 220D attribute has the elements of counters, ETAGS, and set points.

When a user activates the appropriate symbol(s) on the data hierarchy 230, the corresponding data 235 is then displayed in the displayed data pane 210. As shown in FIG. 2A, the user has activated the IOT symbol, paper path symbol, fuser symbol and the set points symbol to display the set point temperature parameters in the displayed data pane 210.

The sequence bar 215 also has an ADD symbol 225. When the user activates this icon, a list of attributes associated with the data on the NVM is listed. By scrolling through the list of attributes, a user may add attribute symbols to the sequence bar 215. The user may delete attribute symbols by activating the selected symbol and a delete option may appear for the user to delete the symbol. The sequence bar 215 may further permit to re-order the sequence of the attributes symbols. More particularly, a user may pick and move a selected attribute symbol from one position in the sequence to another position in the sequence bar.

Figure 2B:
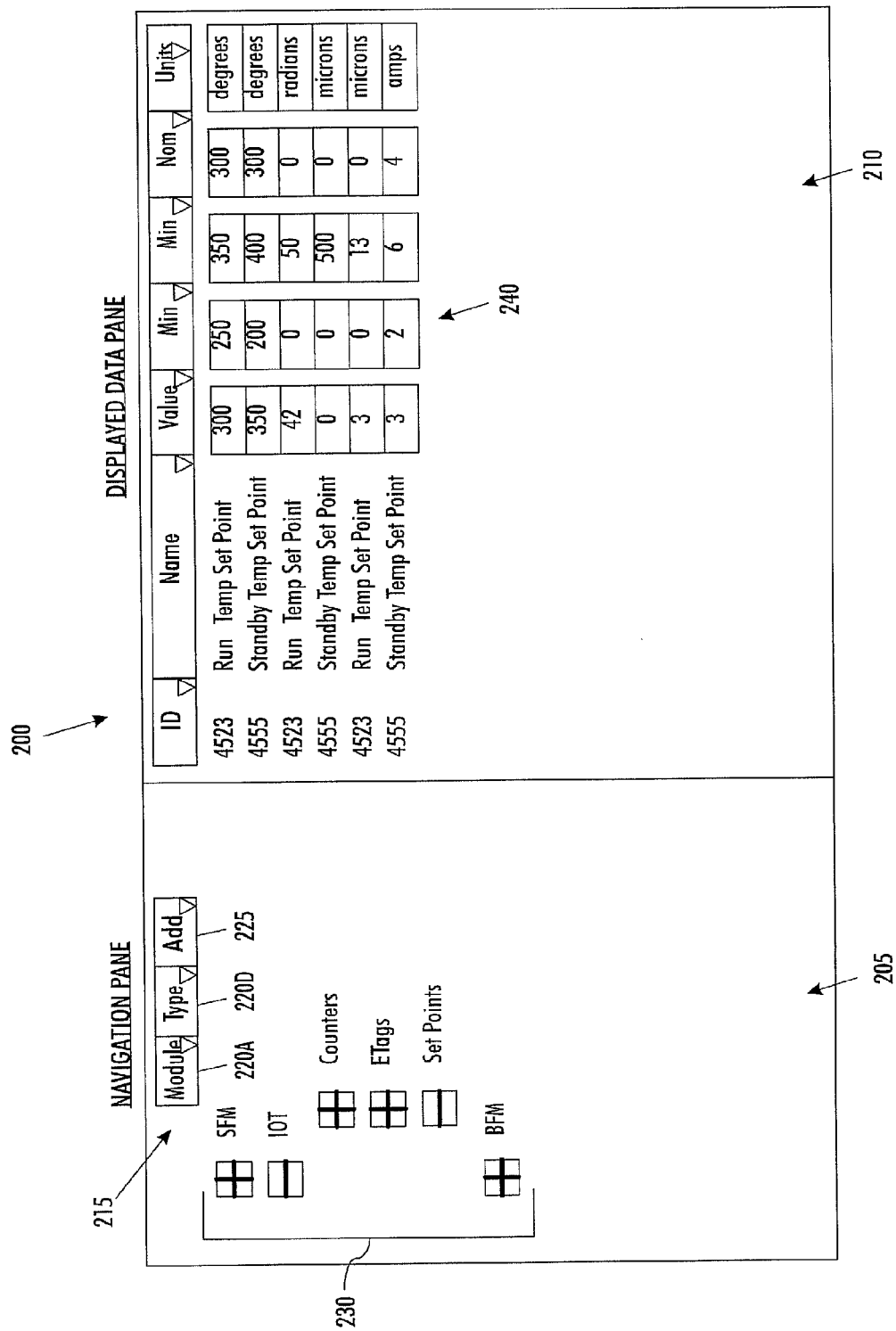
FIG. 2B illustrates yet another embodiment of the display device in accordance with yet another embodiment.

FIG. 2B illustrates the user interface 200 after a user has modified the sequence bar 215. Since FIG. 2A and FIG. 2B share common features, the description of the common features in FIG. 2B is omitted and that the descriptions of these features with respect to FIG. 2A being relied upon to provide adequate descriptions of the comment features.

As shown in FIG. 2B, the attribute symbols on the sequence bar 215 are module symbol 220A and type symbol 220D. Accordingly, within the data hierarchy 230, the module root has leaf nodes of SFM, IOT, and BFM. The type symbol 220D is a leaf node of module symbol 220A, which further comprises of two three leaf elements of counters, ETAGS, and set points. When the user activates the symbols IOT and set points, a second set of data 240 is then displayed in the displayed data pane 206.

FIG. 3 illustrates an exemplary flow diagram 300 implemented by the CDM 120 in accordance with another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the CDM 120 may be configured to determine attributes of a data set, in step 302. The data set may be stored in NVM 104 in the imaging device 102. The set of attributes may be implemented by determining which data share same or similar characteristics. In step 304, the CDM 120 may be configured to associate a symbol with each attribute. In some embodiments, the symbol may be represented as a graphical image, an icon or other similar device.

FIG. 4 illustrates another exemplary flow diagram 400 implemented by the CDM 120 in accordance with yet another embodiment. It should be readily apparent to those of ordinary skill in the art that the flow diagram 400 depicted in FIG. 4 represents a generalized illustration and that other steps may be added or existing steps may be removed or modified.

As shown in FIG. 4, the CDM 120 may display a default sequence of symbols on a navigation pane 202, in step 402. As previously described, the attribute symbols of FIG. 4 may be represented by graphical images or icons. The default sequence of symbols may be displayed as a sequence bar 204 within the navigation pane 202.

In step 404, the CDM 120 may be configured to receive user input 202. As previously described, the user may interface with the CDM 120 through a mouse, a keyboard, a touch screen panel, stylus, or any other similar device.

In step 406, the CDM 120 may be configured to determine whether the user input 202 selected to move the attribute symbols on the navigation bar 304. If the user input 202 did not move the attribute symbols the CDM 120 may be configured to execute the user input 202, in step 408. If the user input moved any attribute symbols on the sequence bar 304, the CDM 120 may be configured to display re-sequenced symbols on the navigation pane 302, in step 410. The CDM 120 may be configured to display the attribute symbols on the sequence bar 204 within the navigation pane 202. The CDM 120 may also be configured to display a re-sequenced hierarchy within the navigation pane 302, in step 412.

Figure 5:
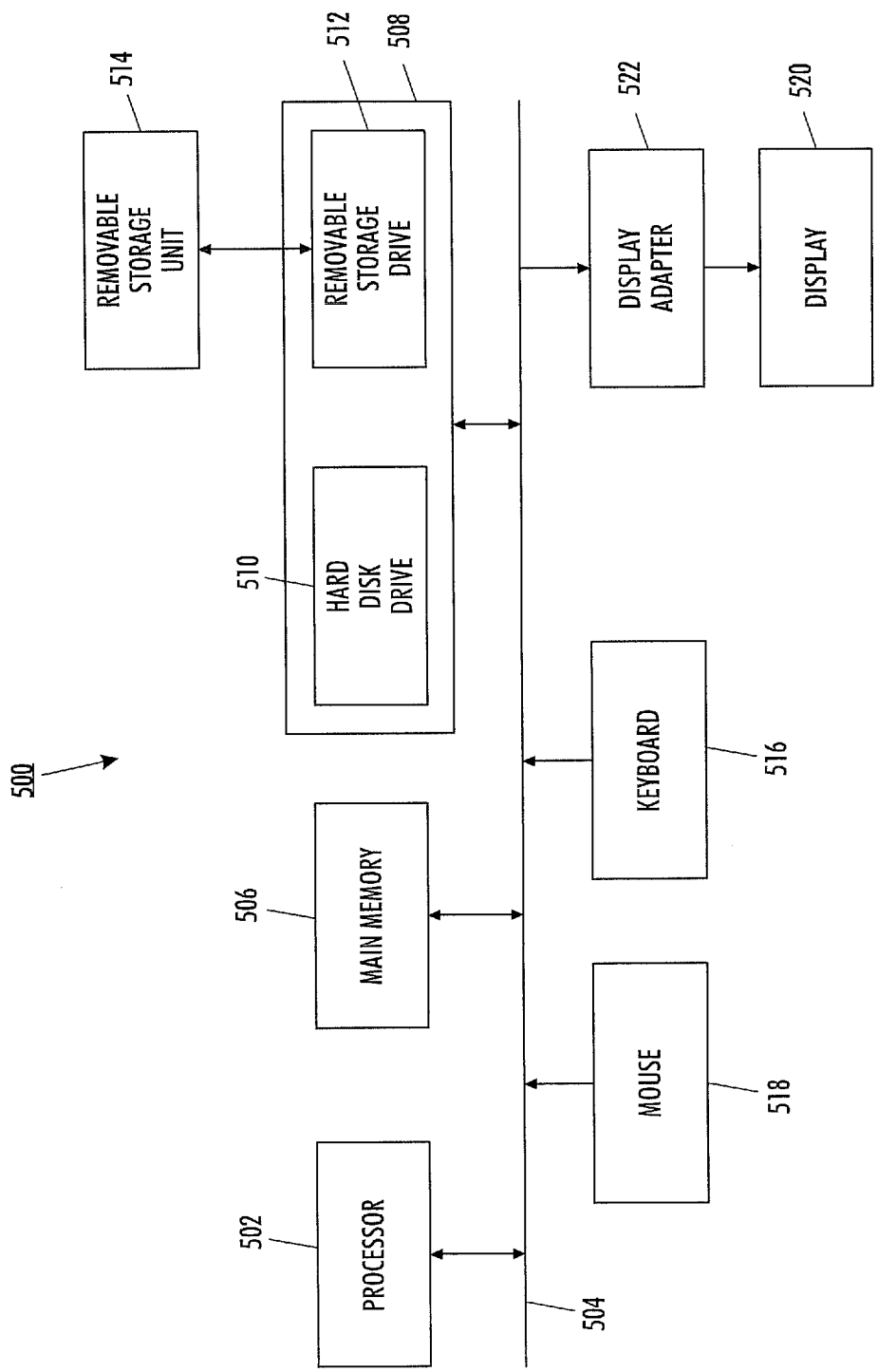
FIG. 5 illustrates an exemplary computing platform in accordance with yet another embodiment.

FIG. 5 illustrates an exemplary block diagram of a computing platform 500 where an embodiment may be practiced. The functions of the CDM may be implemented in program code and executed by the computing platform 500. The CDM may be implemented in computer languages such as PASCAL, C, C++, JAVA, etc.

As shown in FIG. 5, the computer system 500 includes one or more processors, such as processor 502 that provide an execution platform for embodiments of the CDM. Commands and data from the processor 502 are communicated over a communication bus 504. The computer system 500 also includes a main memory 506, such as a Random Access Memory (RAM), where the CDM may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the CDM may be stored. The removable storage drive 512 reads from and/or writes to a removable storage unit 514 in a well-known manner. A user interfaces with the server CDM with a keyboard 516, a mouse 518, and a display 520. The display adapter 522 interfaces with the communication bus 504 and the display 520, which receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for displaying data by a changeable directory, the method comprising:
   displaying a first sequence of attributes;
   determining a first plurality of icons, wherein the first plurality of icons are determined based on an association with a first attribute of the first sequence of attributes;
   displaying the first plurality of icons at a first tier of a changeable directory;
   receiving an activation of a first icon of the first plurality of icons;
   determining a second plurality of icons based on the activation of the first icon of the first plurality of icons, wherein the second plurality of icons are determined based on an association with:
      a second attribute of the first sequence of attributes, wherein the second attribute of the first sequence of attributes is not the first attribute of the first sequence of attributes; and
      the first icon of the first plurality of icons;
   displaying the second plurality of icons at a second tier of the changeable directory;
   receiving a selection of a first selected icon of the second plurality of icons;
   displaying a first operating parameter of a first module of an imaging device based on the section of the first selected icon, wherein the first operating parameter is used for at least one of initializing, repairing, or calibrating the imaging device;
   receiving a change to the first sequence of attributes;
   determining a second sequence of attributes based on the change to the first sequence of attributes;
   displaying the second sequence of attributes;
   determining a third plurality of icons, wherein the third plurality of icons are determined based on an association with a first attribute of the second sequence of attributes, and the first attribute of the second sequence of attributes is not the first attribute of the first sequence of attributes;
   displaying the third plurality of icons at the first tier of the changeable directory, whereby at least one icon of the third plurality of icons was previously displayed at the second tier before receiving the change to the first sequence of attributes;
   receiving an activation of a first icon of the third plurality of icons;
   determining a fourth plurality of icons based on the activation of the first icon of the third plurality of icons, wherein the fourth plurality of icons are determined based on an association with:
      a second attribute of the second sequence of attributes, wherein the second attribute of the second sequence of attributes is not the first attribute of the second sequence of attributes; and
      the first icon of the third plurality of icons;
   displaying the fourth plurality of icons at the second tier of the changeable directory, whereby at least one icon of the fourth plurality of icons was previously displayed at the first tier before receiving the change to the first sequence of attributes;
   receiving a selection of a second selected icon of the fourth plurality of icons; and
   displaying a second operating parameter of a second module of the imaging device based on the section of the second selected icon, wherein the second operating parameter is used for at least one of initializing, repairing, or calibrating the imaging device.

2. The method of claim 1, further comprising determining the first sequence of attributes, wherein the determining the first sequence of attributes is realized by defining a common set of attributes for a directory of data.

3. The method of claim 2, wherein the data is stored in non-volatile memory.

4. The method of claim 1, wherein each icon of the first plurality of icons and the second plurality of icons is implemented with a representative graphic image.

5. The method of claim 1, wherein the displaying the first sequence of attributes and the displaying the second sequence of attributes is implemented using a navigation bar of icons.

6. A non-transitory computer readable storage medium storing instructions to implement the method of claim 1.

7. A method for displaying data, the method comprising:
   displaying a first plurality of icons associated with a first attribute in a first tier of a changeable directory, wherein the first attribute is first in a sequence of attributes;
   nesting a second plurality of icons in a second tier of the changeable directory based on:
      an association with a second attribute, wherein the second attribute is second in the sequence of attributes and is not the first attribute; and
      an association with one or more icons of the first plurality of icons;
   receiving an activation of a first icon of the first plurality of icons;
   displaying one or more icons of the second plurality of icons in the second tier of the changeable directory based on the activation of the first icon, wherein the one or more icons of the second plurality of icons are associated with the first icon;
   receiving a selection of a first selected icon of the second plurality of icons;
   displaying a first operating parameter of a first module of an imaging device based on the section of the first selected icon, wherein the first operating parameter is used for at least one of initializing, repairing, or calibrating the imaging device;
   receiving a change in the sequence of attributes;
   determining a changed sequence of attributes based on the change in the sequence of attributes;
   displaying a third plurality of icons associated with a first changed attribute in the first tier of the changeable directory, wherein the first changed attribute is first in the changed sequence of attributes and is not the first attribute, and whereby at least one icon of the third plurality of icons was previously displayed at the second tier before receiving the change to the first sequence of attributes;
   nesting a fourth plurality of icons in the second tier of the changeable directory based on:
      an association with a second changed attribute, wherein the second changed attribute is second in the changed sequence of attributes and is not the first changed attribute; and
      an association with one or more icons of the third plurality of icons; and
   receiving an activation of a second icon of the third plurality of icons;
   displaying one or more icons of the fourth plurality of icons in the second tier of the changeable directory based on the activation of the second icon, wherein the one or more icons of the fourth plurality of icons are associated with the second icon, and whereby at least one icon of the fourth plurality of icons was previously displayed at the first tier before receiving the change in the sequence of attributes;
receiving a selection of a second selected icon of the fourth plurality of icons; and
displaying a second operating parameter of a second module of the imaging device based on the section of the second selected icon, wherein the second operating parameter is used for at least one of initializing, repairing, or calibrating the imaging device.

8. A method for displaying data, the method comprising:
displaying a selected icon in a first level of a changeable directory, wherein:
  a structure of the changeable directory can be rearranged by changing a sequence of attributes;
  the selected icon is associated with a first attribute of the sequence of attributes; and
  the selected icon in the first level was previously displayed in a second level of the changeable directory before the changeable directory was rearranged;
selecting a set of one or more icons to display in the second level of the changeable directory based on:
  the selected icon in the first level of the changeable directory; and
  a second attribute in the sequence of attributes, wherein at least one icon of the one or more icons was previously displayed in the first level of the changeable directory before the changeable directory was rearranged
receiving a selection of a second selected icon of the set of one or more icons; and
displaying an operating parameter of a module of an imaging device based on the section of the second selected icon, wherein the operating parameter is used for at least one of initializing, repairing, or calibrating the imaging device.

9. A method for displaying data by a changeable directory, the method comprising:
displaying a row of attributes comprising a first attribute of the row of attributes and a second attribute of the row of attributes;
displaying a first column of icons corresponding to the first attribute of the row of attributes;
receiving a first activation of an icon of the first column of icons;
displaying, in response to the receiving the first activation of the icon, a second column of icons corresponding to the second attribute of the row of attributes;
receiving a rearranged row of attributes, wherein the rearranged row of attributes comprises:
  a first attribute of the rearranged row of attributes that is equivalent to the first attribute of the row of attributes; and
  a second attribute of the rearranged row of attributes that is different from the second attribute of the row of attributes;
displaying the rearranged row of attributes;
displaying the first column of icons corresponding to the first attribute of the rearranged row of attributes;
receiving a second activation of the icon of the first column of icons;
displaying, in response to the receiving the second activation of the icon, a third column of icons corresponding to the second attribute of the rearranged row of attributes, wherein:
  the third column of icons is not the second column of icons;
  at least one icon of the third column of icons was in the second column of icons before receiving the rearranged row of attributes; and
at least one icon of the third column of icons was in a fourth column of icons before receiving the rearranged row of attributes,
receiving a selection of a selected icon of the third column of icons; and
displaying an operating parameter of a module of an imaging device based on the section of the selected icon, wherein the operating parameter is used for at least one of initializing, repairing, or calibrating the imaging device.

* * * * *